(12) United States Patent
Baird et al.

(10) Patent No.: US 7,724,780 B2
(45) Date of Patent: May 25, 2010

(54) SYNCHRONIZATION OF ONE OR MORE SOURCE RTP STREAMS AT MULTIPLE RECEIVER DESTINATIONS

(75) Inventors: Randall B. Baird, Austin, TX (US); Scott Firestone, Mountain View, CA (US)

(73) Assignee: Cisco Technology, Ink., San Jose, CA (US)

( * ) Notice: Subject to any disclaimer, the term of this patent is extended or adjusted under 35 U.S.C. 154(b) by 467 days.

(21) Appl. No.: 11/788,620

(22) Filed: Apr. 19, 2007

(65) Prior Publication Data

US 2008/0259966 A1    Oct. 23, 2008

(51) Int. Cl.
*H04J 3/06* (2006.01)
(52) U.S. Cl. ..................................... 370/509
(58) Field of Classification Search ....................... None
See application file for complete search history.

(56) References Cited

U.S. PATENT DOCUMENTS

2004/0199659 A1* 10/2004 Ishikawa et al. ............. 709/235
2004/0228367 A1* 11/2004 Mosig ......................... 370/503
2006/0253600 A1* 11/2006 Hannuksela ................ 709/231

* cited by examiner

*Primary Examiner*—Steven H Nguyen
*Assistant Examiner*—Alex Skripnikov
(74) *Attorney, Agent, or Firm*—The Law Offices of Bradley J. Bereznak

(57) ABSTRACT

In one embodiment, a method includes synchronizing to a common reference timeframe between a sender node and a plurality of receiver nodes connected over a packet-based network. The sender node sends Real-Time Protocol (RTP) frames to the receiver nodes, and also sends a RTP Control Protocol (RTCP) sender report to each receiver node that contains a rendering offset value, each receiver node rendering the RTP frames at a render time equal to a sampling time in units of the common reference timeframe plus the rendering offset value. It is emphasized that this abstract is provided to comply with the rules requiring an abstract that will allow a searcher or other reader to quickly ascertain the subject matter of the technical disclosure.

7 Claims, 6 Drawing Sheets

SYNCHRONIZATION OF ONE OR MORE SOURCE RTP STREAMS AT MULTIPLE RECEIVER DESTINATIONS

TECHNICAL FIELD

This disclosure relates generally to the field of audio/video data packet transmissions over a network.

BACKGROUND

The Real-Time Protocol (RTP) is a well-known standard for transmitting real-time media data such as audio or video streams. While it does not guarantee real-time delivery of data, RTP does provide mechanisms for synchronizing multiple source media streams at a single destination, i.e., a single receiver or endpoint device. These mechanisms, for example, allow an endpoint to synchronously play out received audio and video streams using media rendering devices (e.g., an audio speaker and video monitor). To facilitate the synchronous playout of multiple streams at a given destination, RTP packets typically contain RTP timestamps, which define a time at which the payload of an RTP packet was sampled, in units of the sampling clock frequency. The RTP timestamps of each stream, however, are not directly related to one another. In order to relate the RTP time bases of different streams, the sender periodically issues RTP Control Protocol (RTCP) packets, which contain information that maps the RTP timebases of each stream into a common reference or "wall clock" timebase, using the format of timestamps in the Network Time Protocol (NTP). The sender uses the same reference timebase for each stream sent to each receiver. The receiver uses this RTCP information to determine the relative mapping between multiple streams arriving from the same sender, which ensures that the audio and video streams are played out at the rendering devices with the proper relative timing relationship to achieve synchronicity.

While a receiver normally uses the sender NTP timebase to establish the relative relationship between audio and video streams, it cannot establish the absolute real-time at which the streams should playout at the rendering devices. As a result, when multiple receivers attempt to play a single source RTP stream, synchronicity is problematic. This is due to the fact that the end-to-end delays (from the sender's sampling of a media input to the receiver's rendering device) are different for each receiver. By way of example, variations in the delays may result from differences in the average input jitter buffer depth, differences in the decoding delay, and variations in the rendering delays among the different receivers.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

Figure 1:
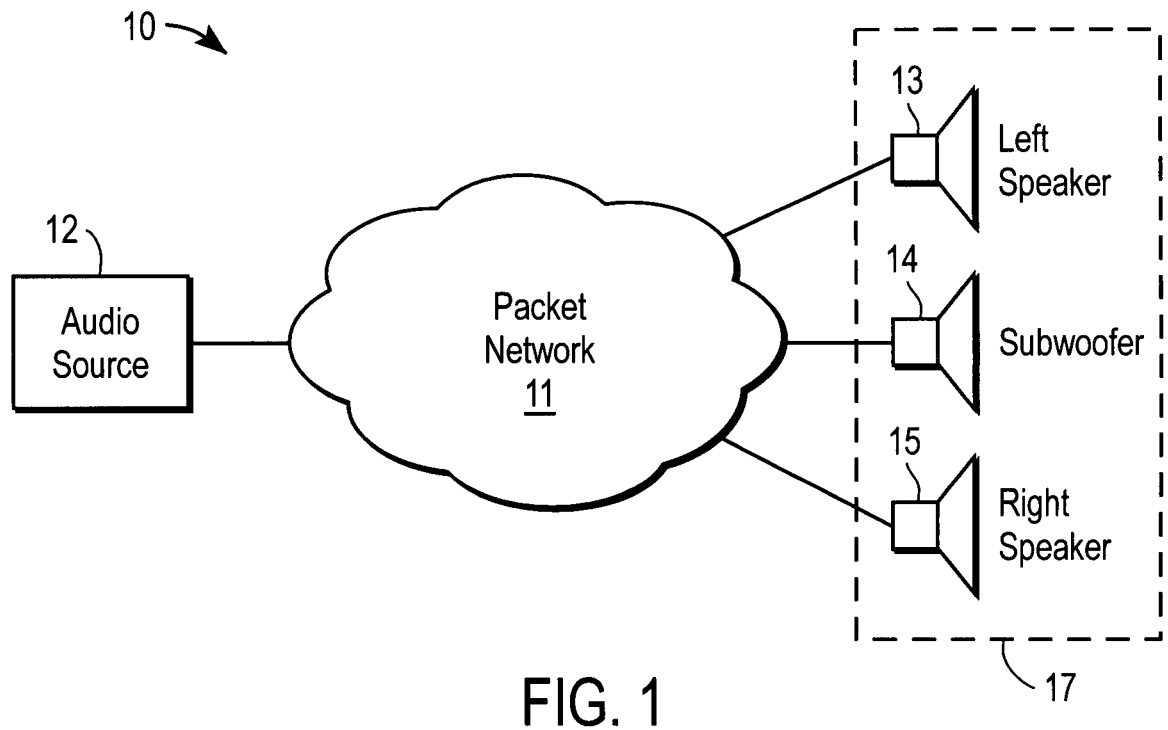
FIG. 1 illustrates an example packet-based communication system with a single source and multiple receivers.

In the following description specific details are set forth, such as device types, system configurations, protocols, applications, methods, etc., in order to provide a thorough understanding of the disclosure herein. However, persons having ordinary skill in the relevant arts will appreciate that these specific details may not be needed to practice the embodiments described.

In the context of the present application, a computer network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

An endpoint (i.e., a sender or receiver) device represents any equipment, node, or other device capable of sending and/or receiving data (media) packets in accordance with the RTP standard, both present and future versions. Examples of endpoint devices include an audio/video appliance (e.g., speakers, video monitors, etc.), a personal digital assistant (PDA); a personal computer (PC), such as notebook, laptop, or desktop computer; a streaming client; a television device with built-in camera and microphone; or any other device, component, element, or object capable of sending, receiving RTP/RTCP packets, or otherwise participating in RTP/RTCP packet exchanges.

As used herein, a common reference timeframe or NTP time is a timeframe, measured in absolute time units (typically in NTP format), to which some or all endpoints may synchronize. A sampling clock timeframe is a timeframe, measured in integral units of a sampling clock frequency that is used to create RTP timestamps. The initial value of the sampling clock time is an arbitrary value which is unrelated to the common reference time. A decoder clock timeframe is a timeframe, measured in integral units of the rendering clock frequency, which controls when RTP samples are fed into a decoder. An RTP timestamp is a value placed in each RTP packet that represents the sampling clock time at which the RTP sample was produced.

A sampling time is defined as the time, in units of the common reference timeframe, at which an RTP sample is taken. In accordance with the embodiments described herein, the sender of an RTP packet periodically sends an RTCP sender report (SR) to all receivers. Each SR contains a mapping between a recent RTP timestamp and the common NTP reference time that corresponds to the RTP timestamp. Given the receipt of a plurality of SRs, the current sampling time, NTPc, associated with any current RTP timestamp, RTPc, may be computed by a receiver using the mathematical formula, NTPc=Skew*(RTPc−RTPr)/ClockFreq+NTPr, where RTPr is the RTP timestamp contained in the most recent SR, NTPr is the common reference time contained in the most recent SR, ClockFreq is the sampling clock frequency in cycles per second, and Skew is a coefficient that represents the amount of drift or "creep" between the sampling timeframe and the common reference timeframe. In mathematical terms, Skew=ClockFreq*(NTPr−NTPp)/(RTPr−RTPp), where ClockFreq is the sampling clock frequency in cycles per second, NTPr is the common reference time contained in the most recent SR, NTPp is a common reference time contained in a previous SR, RTPr is the RTP timestamp contained in the most recent SR, and RTPp is the RTP timestamp associated with NTPp in a previous SR.

Rendering time, in contrast, is the time, in units of the common reference timeframe, at which an RTP sample should be presented to the user. For audio, rendering time is the time that an acoustic signal is produce from a loudspeaker. For video, rendering time is the time that light from a video frame is emitted from the display. Because rendering time is given in the common reference timeframe, it is appreciated that multiple RTP receivers rendering simultaneously sampled RTP packets at the same rendering time results in synchronized rendering of those samples. Lastly, rendering time offset, or rendering offset (RO) for short, is the difference between the rendering time and the sampling time.

FIG. 1 illustrates an example packet-based communication system 10 comprising a single audio source 12 (e.g., a stereo amplifier) that sends RTP packets over packet network 11 to a set of RTP-enabled speakers 17 that includes a left speaker 13, a subwoofer 14, and right speaker 15. Each of speakers 13-15 represents a separate and distinct receiver or endpoint device that receives the same or a related sequence (stream) of RTP packets generated by source 12. The related sequence of RTP packets may be transmitted to speakers 13-15 either by multicasting individual RTP packets to all speakers or by unicasting a copy of the RTP packets to each speaker. Furthermore, the sequence of RTP packets may contain identical RTP headers and payloads for each speaker, or it may contain distinct headers and payloads for each device, with each packet sequence being sampled using a common reference timeframe.

It is appreciated that source 12 may comprise either a single physical sender, or multiple physical senders that function as a distributed sender. In a distributed sender scheme the multiple physical senders communicate with each other in order to closely couple the sourcing of media data. That is, the physical senders correlate their sampling and reference timeframes, and communicate how their streams are synchronized. The physical senders appear as a single virtual sender to the RTP receiver. Thus, in the context of the present application, a single sender or source may comprise either a single virtual sender (e.g., implemented in a distributed manner) or single physical sender/source device.

System 10 comprises an isochronous environment, where the common reference timeframes of receiver devices (speakers) 13-15 are tightly synchronized (i.e., within less than 1-2 milliseconds). This may be achieved through various versions of NTP, or through the IEEE 1588 standard, which provides an accurate clock synchronization system via Media Access Control (MAC) layer protocol. For each RTP stream, source 12 selects a random starting RTP timestamp. In the case where source 12 sends multiple copies of the exact same RTP stream via unicast, each stream may have a different starting random RTP timestamp. In addition, source 12 may periodically issue RTCP packets, which contain the relationship between RTP timestamps and the sender's common reference timeframe.

System 10 may operate in several different modes to synchronously render (playout) a single RTP source stream by the multiple decoders of the corresponding speakers 13-15. In one mode, audio source 12 and speakers 13-15 derive a common reference timeframe by synchronizing to a common reference NTP clock. Speakers 13-15 are configured or coded with a fixed rendering offset (RO). Each speaker renders audio at a rendering time equal to the sampling time+RO.

For example, in one implementation speakers 13-15 are each configured with a large, predetermined, fixed RO, say three seconds, to accommodate a worst case delay between rendering time and sample time. Because the receivers share a common timebase and the rendering offset implies an exact time in that timebase when a given sample should be rendered, rendering of RTP packets with the same sample time is guaranteed to be synchronized across all speakers 13-15. It is appreciated that in this embodiment, only standard sender reports (those without a rendering offset value) are sent by either source 12 or speakers 13-15.

In another mode of operation, source 12 and speakers 13-15 use an NTP timebase that is synchronized to a common time reference. In addition, source 12 issues additional messages to each speaker (receiver) to facilitate synchronization. The receivers do not send messages back to the sender. The additional messages comprise an RTCP packet with a message extension that specifies a fixed RO value, to map the NTP timestamps of RTP packets into an NTP rendering time at the receivers. According to this embodiment, the RO value specified by source 12 is an estimated or expected RO offset that is arrived at by monitoring the NTP latency between packets and the time that the packets are transmitted onto the network. The source sends this expected delay value across the network to each speaker, which then adds this value to the sampling time to calculate the actual render time.

By way of example, source 12 may issue an RTCP SR packet to speakers 13-15 with the message "Rendering offset=1.5 seconds." Consequently, each speaker processes the received RTP packets by converting the RTP timestamp to a sampling time, and then adding the RO value to that sampling time to calculate the render time. Each speaker then ensures that the packet media data (bits) are delivered to the playout device at the calculated render time. Note that the fixed RO value that is selected by the sender should be large enough to accommodate expected worst-case delays experienced by any of the receivers.

Figure 2:
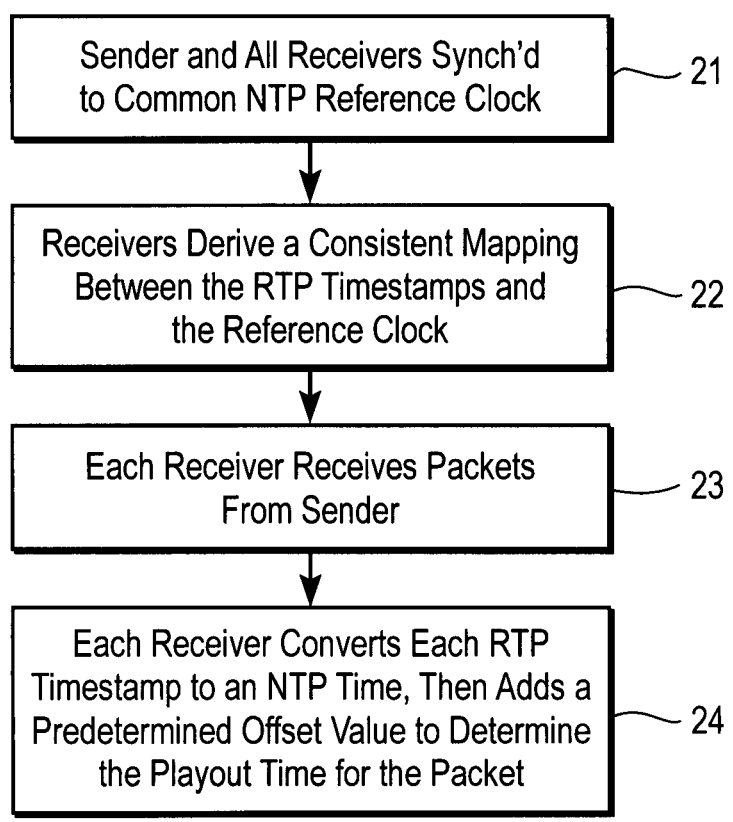
FIG. 2 illustrates an example method wherein multiple receiver devices playout a single media stream in a synchronized manner.

FIG. 2 illustrates an example method wherein multiple receiver devices playout a single media stream in a synchronized manner, consistent with the embodiments described above. The process begins with the sender and all receivers synchronized a common reference clock (block 21). This may be through the use of NTP, IEEE 1588, or some other protocol or mechanism for clock synchronization between sender and receiver nodes connected over a packet-based network. After a common reference clock has been established between the sender and all receivers, the receivers derive a consistent mapping between the RTP timestamps and the corresponding sample times (block 22). This mapping can be derived, for example, by examining RTCP SRs sent from the sender to the receiver, and applying the mapping between RTP and NTP timestamps contained therein. At this point, the receivers start receiving packets from the sender, via either a multicast stream or multiple unicast streams. This is shown occurring at block 23.

As each packet in the stream is received, each receiver computes an exact time for the packet to be rendered by first converting its RTP timestamp to a sample time (using the information derived in block 22 and the method for computing sample time described above) then adds a predetermined rendering offset value to the NTP time (block 24). The RO value may be configured or "hard-wired" directly into the receiver equipment. Alternatively, the offset or delta value may be determined by the sender and sent to the receivers via an application-specific RTCP SR that forces each receiver to render each packet in the stream exactly at a specified RO from the computed sampling time.

It is appreciated that the RO value specified in the RTCP sender report is greater than the maximum rendering delay of any receiver.

Figure 3:
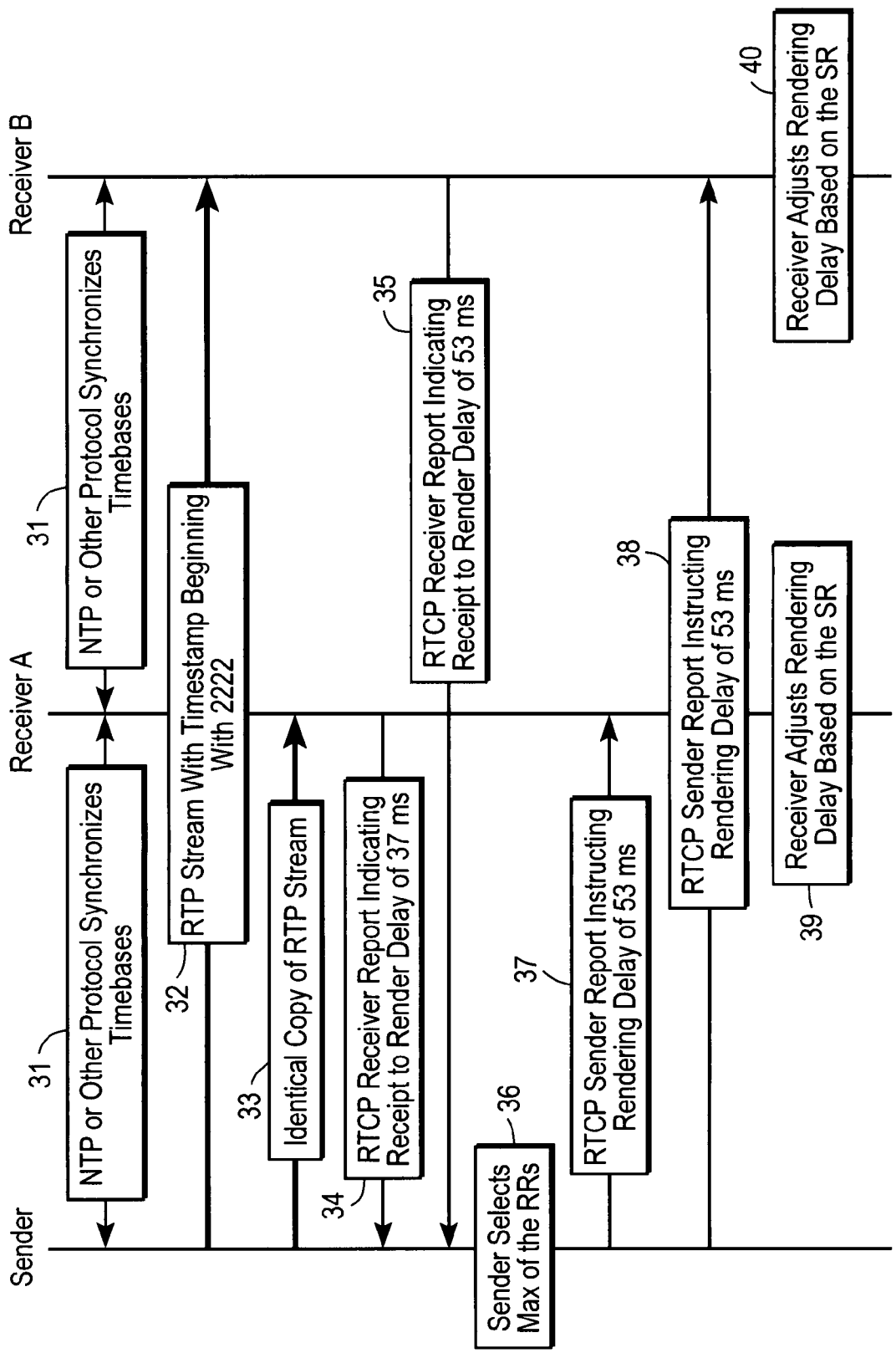
FIG. 3 illustrates another example method wherein multiple receiver devices playout a single media stream in a synchronized manner.

FIG. 3 illustrates another example method or mode of operation wherein multiple receiver devices playout a single media stream in a synchronized manner. In the flow diagram of FIG. 3 the rendering offset value is minimized by having each receiver create a RTCP receiver report that flows from the receivers back to the sender. The RTCP receiver reports indicate the maximum rendering offset between when the packets are sampled by the sender and when they are rendered by the particular receiving device. The sender then selects the maximum rendering offset from all the receiver reports it receives. This maximum RO value is then sent to each of the receivers in a RTCP sender report.

The flow diagram of FIG. 3 begins with the sender and all receivers (receiver A & receiver B in this example) synchronizing to a common timebase using NTP or another protocol. This is shown in FIG. 3 by blocks 31. Next, the sender starts sending the RTP packet stream to both receivers with RTP timestamps. This is shown by blocks 32 & 33, which represent the RTP streams being sent to receiver A & receiver B, respectively. Note that these streams may comprise a single multicast stream or multiple unicast streams. Although not explicitly shown, the sender also periodically sends out an RTCP SR message or report to the receivers that contains a recent RTP timestamp and the common reference time associated with that timestamp. This allows the receiver to map the synthetic RTP sampling clock timeframe into the common reference timeframe, using methods described above.

Once the receivers start playing out the media, they can send back an application-specific RTCP receiver report (message) indicating the sample-to-render delay associated with that particular receiver device. For example, receiver A may communicate in a message sent back to the sender a sample-to-render delay of 37 ms (block 34), with receiver B communicating a sample-to-render delay of 53 ms (block 35). The sender then selects the largest (i.e., the worst-case) delay value from all the receivers (block 36). The sender then issues a RTCP SR to the receivers that contains a rendering offset equal to the largest sample-to-render delay received. In this example, the sender report instructs receivers A & B to implement a rendering delay of 53 ms, as shown by blocks 37 & 38, respectively. The transmission of the sender report may be either multicast or multi-unicast. Based on the sender report, each of the receivers adjusts its rendering delay accordingly (blocks 39 & 40).

It should be understood that the receivers may periodically inform the sender of any changes to its associated delta or delay value. For instance, in the event that a receiver changes its maximum sample-to-render delay, perhaps as a result of a change to its input jitter buffer or a change in network conditions, it sends another RTCP receiver report message to the sender with the new sample-to-render delay value. The sender then determines whether the new delay value is larger than the previous delay value communicated to the receivers. If so, the sender generates a new RTCP message containing the new RO value that gets sent to all of the receivers.

In a variation of the method described above, the receivers use an NTP timebase that is synchronized to a common reference time. But the single sender does not synchronize its NTP timebase to a common reference time. This is essentially the same as the embodiment of FIG. 3; however, because the sender's NTP timebase is not synchronized to the same reference time as the receivers, neither the sender nor the receivers begins with an estimate for the initial delta value. Instead, the receivers wait to receive RTP and RTCP packets from the sender before determining their respective sample-to-render delay values, which are then sent to the sender in the form of an RTCP receiver report.

Practitioners in the art will appreciate that because the sender and receiver reference timebases are not synchronized, the sample-to-render delay value is actually more like a mapping between the sender reference timeframe and the receiver reference timeframe. In a specific implementation, the receivers compensate for drift that may occur between the two timeframes by periodically re-sending the sample-to-render delay value back to the sender. The sender then updates the receivers accordingly.

Figure 4:
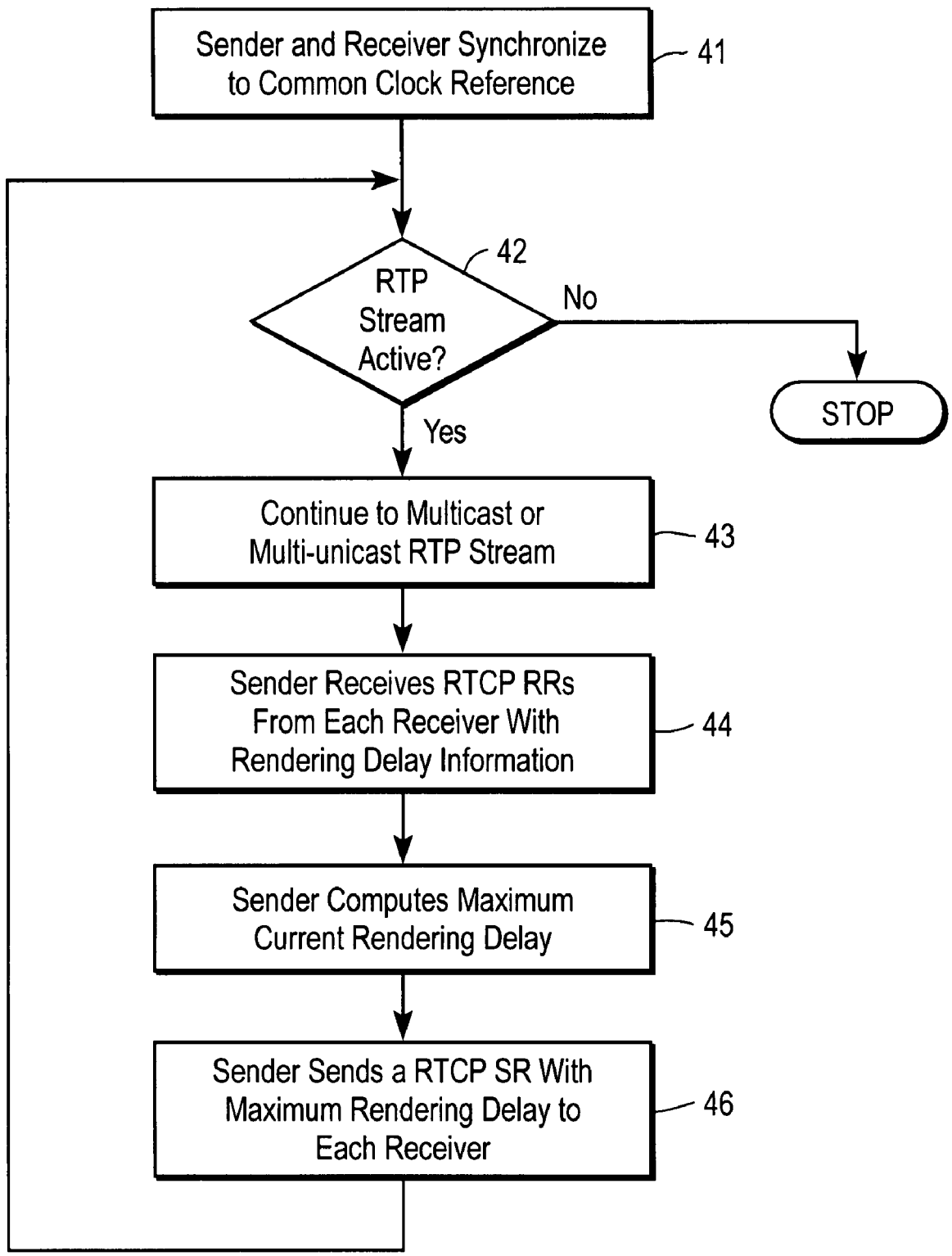
FIG. 4 illustrates an example method of operation for a sender device that sends a single media stream to multiple receiver devices.

FIG. 4 illustrates an example method of operation for a sender device that sends a single media stream to multiple receiver devices. The process begins with the sender (and all receivers) synchronizing to a common clock reference using any one of a variety of timebase protocols, e.g., NTP, IEEE 1588, or the like (block 41). At this point, the sender may begin streaming RTP packets to the receivers. During active streaming (block 42) data is continuously sent to the receivers via multicast or multi-unicast RTP streams (block 43). Each RTP packet contains an RTP timestamp, whose value is set to a relative clock time based on when the data in the RTP packets was sampled. Although not shown in the example, the sender may periodically send RTCP sender reports to the receiver, which contain a mapping between the most recent RTP timestamp and the common reference time associated with the RTP sample time.

Meanwhile, the sender receives periodic RTCP receiver reports from each receiver that contains associated maximum sample-to-render delay information (block 44). From this information, the sender may compute a maximum current rendering offset, which is the maximum or worst-case sample-to-render delay as among all the receivers (block 45). A sender then selects the maximum or worst-case rendering offset and sends it in an RTCP sender report to each receiver (block 46). Each of the receivers applies the delay value such that each RTP packet in the stream is rendered at an NTP time (i.e., the synchronized NTP time as computed by the receiver) that is equal to the RTP timestamp time, mapped to an NTP time, plus the specified time offset or delay.

Figure 5:
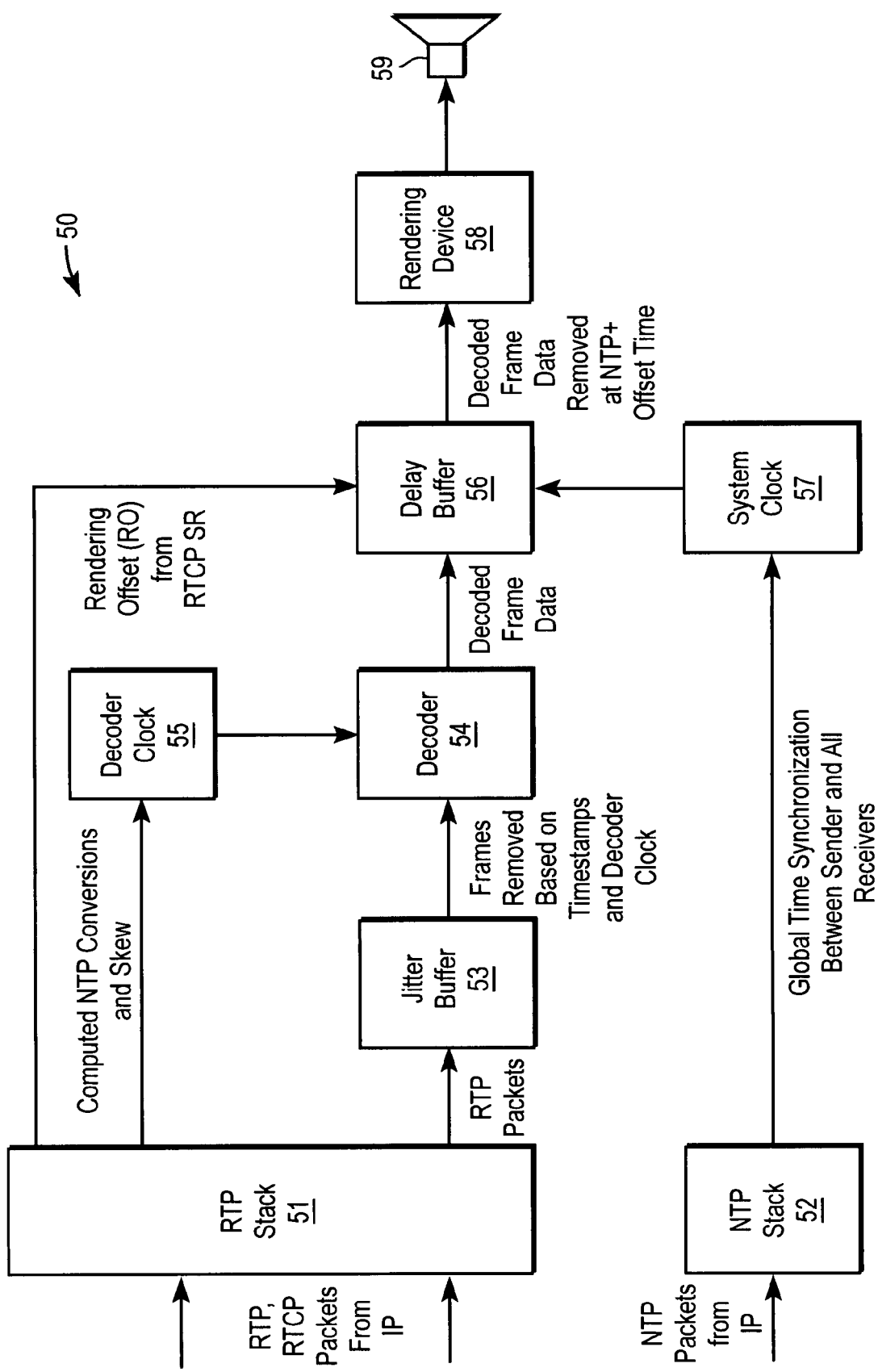
FIG. 5 illustrates an example receiver device architecture.

FIG. 5 illustrates an example architecture for a receiver device 50 that includes an RTP protocol stack 51 and an NTP protocol stack 52 for receiving RTP/RTCP packets and NTP packets, respectively, from an IP network. The rendering offset (RO) contained in the RTCP sender report is extracted from the RTCP packets and input into a delay buffer 56. The rendering offset is the difference between the desired rendering time for an RTP packet and that packet's sample time, as computed using methods described above. Computed sample times and skew are output from stack 51 and applied to a decoder clock 55.

After they are output from stack 51, the RTP packets pass through a jitter buffer 53, which delays packets enough so that variations in inter-packet arrival times (called jitter) does not result in a decoder underflow, and a decoder 54, which outputs decoded media data to delay buffer 56. It is understood that decoder 54 may also expand or compress the output media data to compensate for variations between the decoder clock, the sampling clock, and the common reference timeframe. NTP stack 52 provides a common reference timeframe (between sender and all receivers) that drives system clock 57, which provides a time reference for delay buffer 56. Each decoded dataset to be rendered on the rendering device (loudspeaker, video display, etc.) has a computed NTP sampling timestamp, NTPc. Delay buffer 56 sends each data set to rendering device 58 so that its rendering time is at a time NTPrender=NTPc+RO.

In another embodiment, delay buffer 56 may be implemented as part of jitter buffer 53, in which case the decoder decodes a frame in constant time, which constant time is then subtracted from the rendering offset.

Figure 6:
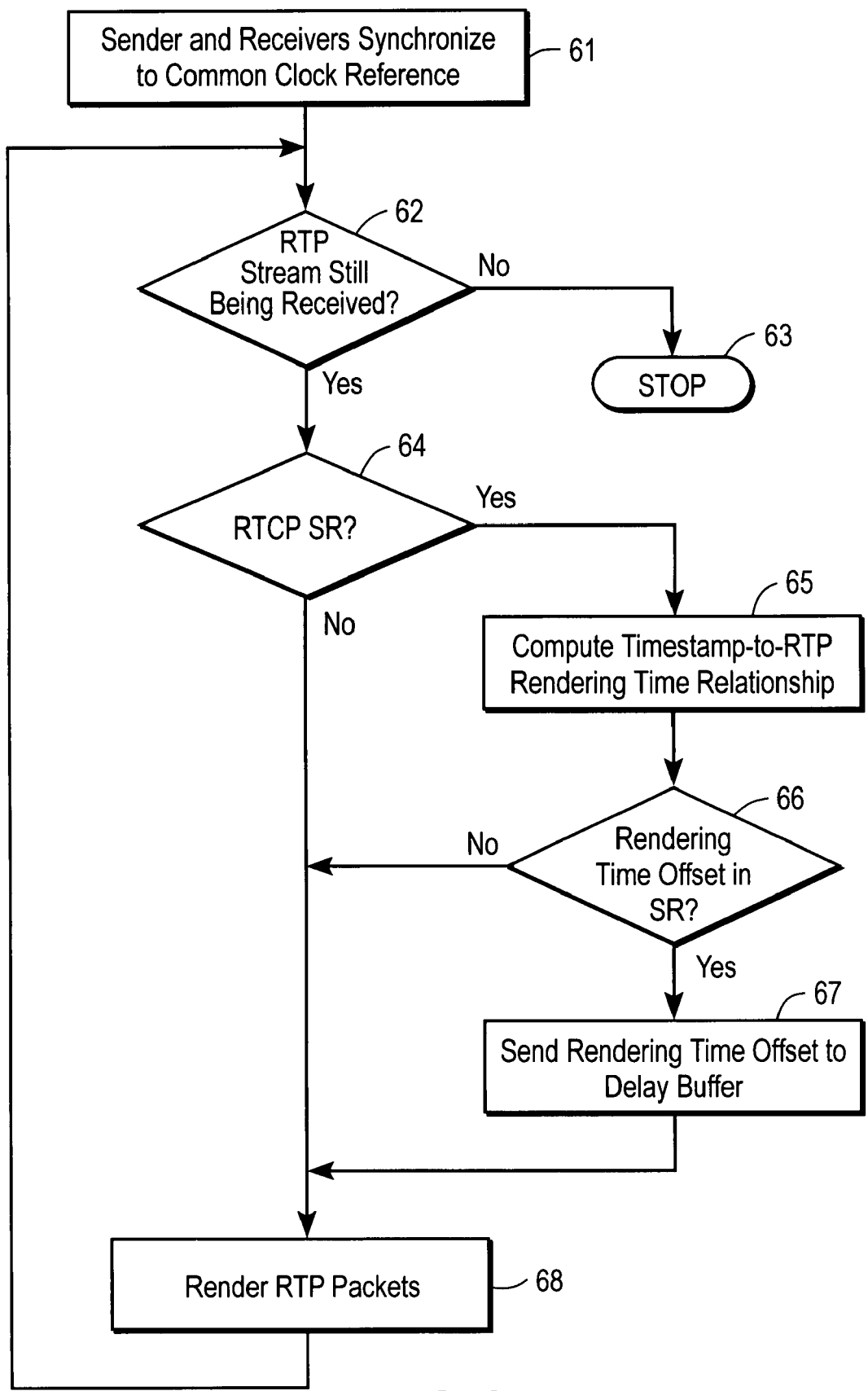
FIG. 6 illustrates an example method of operation for the receiver device architecture shown in FIG. 5.

FIG. 6 illustrates an example method of operation for the receiver device architecture shown in FIG. 5. As was the case in the previous examples, the first step is the synchronizing of the sender and receivers to a common clock reference (block 61). If an RTP packet stream is not being received by the receiver (block 62), the process of FIG. 6 stops (block 63). If RTP packets are being received and an RTCP sender report arrives (block 64), the receiver computes the timestamp-to-RTP rendering time relationship in accordance with the mathematical formulas given above (block 65). If a rendering time offset is included in the sender report (block 66), that offset value is extracted and input into the delay buffer (block 67). The RTP packets being received are then rendered at a time equal to the computed NTP timestamp plus the rendering offset (block 68). In the event that no rendering time offset is included in the sender report, or if no RTCP sender report has been received, the RTP packets are simply rendered as without a rendering offset, or are rendered using the most recent value for the rendering offset.

Figure 7:
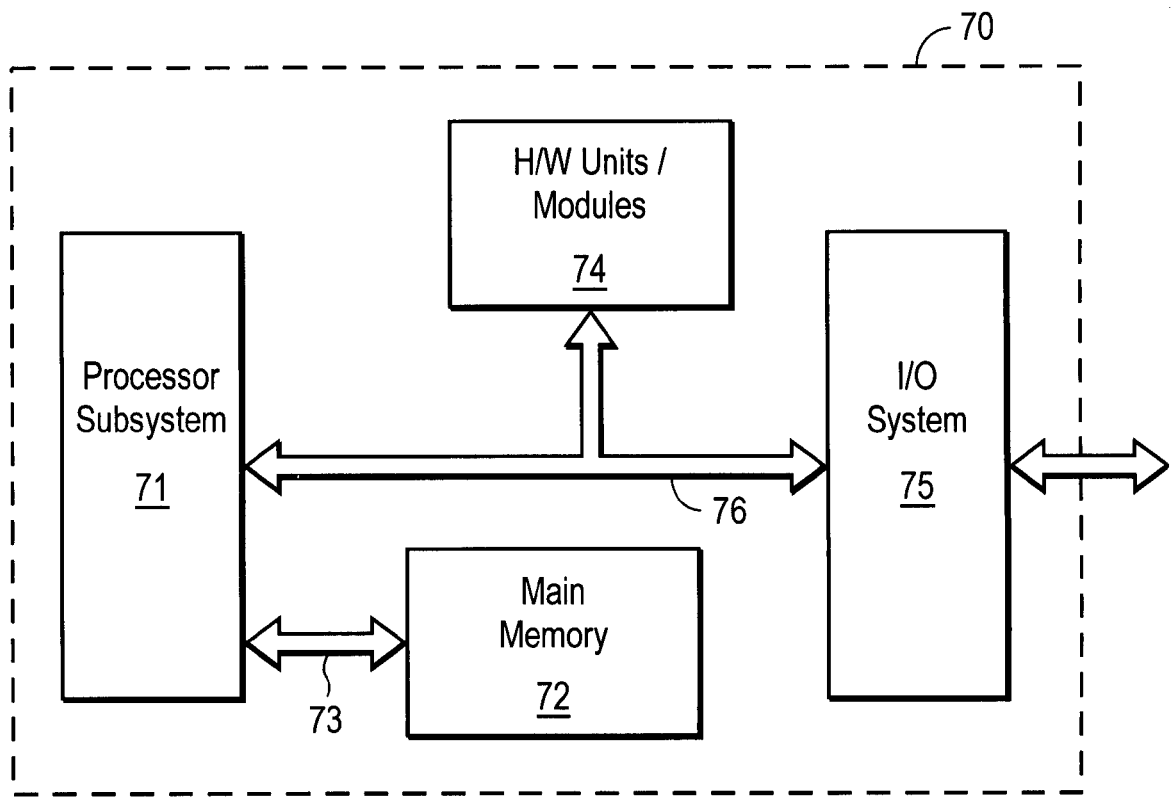
FIG. 7 illustrates basic components of an example node or network device.

FIG. 7 illustrates an example endpoint device or node 70, such as may comprise a typical sender or receiver device. Node 70 comprises a number of basic subsystems including a processor subsystem 71, a main memory 72 and an input/output (I/O) subsystem 75. Data is transferred between main memory ("system memory") 72 and processor subsystem 71 over a memory bus 73, and between the processor and I/O subsystems over a system bus 76. Examples of the system bus may include the conventional lightning data transport (or hyper transport) bus and the conventional peripheral component [computer] interconnect (PCI) bus. Node 70 may also comprise other hardware units/modules 74 coupled to system bus 76 for performing additional functions. Processor subsystem 71 may comprise one or more processors and a controller device that incorporates a set of functions including a system memory controller, support for one or more system buses and direct memory access (DMA) engines.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include floppy diskettes, optical disks, OD-ROMs, and magneto-optical disks, ROMs, RAMs, EPROMs, FEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method comprising:
synchronizing to a common reference timeframe between a sender node and a plurality of receiver nodes connected over a packet-based network;

sending, by the sender node, Real-Time Protocol (RTP) frames to the receiver nodes via a multicast transport or multiple unicast transports;

sending, by the sender node, an RTP Control Protocol (RTCP) sender report (SR) to each receiver node, the RTCP SR containing an offset value, each receiver node rendering each of the RTP frames at a rendering time approximately equal to a sampling time of each RTP frame, as measured in units of the common reference timeframe, plus the offset value, the offset value being greater than a maximum delay between a sample time of an RTP frame at the sender node and a rendering time of the RTP frame at any of the receiver nodes;

receiving receiver messages from each receiver node, each receiver message containing associated rendering delay information;

computing a maximum current rendering delay from the rendering delay information received from the receiver nodes;

adjusting the offset value to be substantially equal to the maximum current rendering delay; and sending, by the sender node, a new RTCP SR to each receiver node that contains the adjusted offset value.

2. The method of claim 1 further comprising adjusting the sampling time to compensate for skew between a sampling timeframe of the sender node and a rendering timeframe of a receiver nods.

3. The method of claim 1, wherein the rendering delay information comprises an amount of time, in units of the common reference timeframe, between the sampling time and the rendering time.

4. The method of claim 1, wherein the receiver message comprises an RTP Control Protocol (RTCP) receiver report (SR).

5. A non-transitory computer readable medium encoded with a computer program, when executed the computer program operable to:

synchronize a sender node to a common reference timeframe, a plurality of receiver nodes connected with the sender node over a packet-based network also being synchronized to the common reference timeframe;

send Real-Time Protocol (RTP) frames from the sender node to the receiver nodes;

send a RTP Control Protocol (RTCP) sender report to each receiver node that contains an offset value, each receiver node rendering each of the RTP frames at a render time approximately equal to a sampling time of the RTP frames, as measured in units of the common reference timeframe, plus the offset value, the offset value being greater than a maximum delay between a sample time of an RTP frame at the sender node and a rendering time of the RTP frame at any of the receiver nodes;

receive RTCP receiver reports from each receiver node, each RTCP receiver report containing associated sample-to-render delay information;

compute a maximum current sample-to-render delay from the sample-to-render delay information received from the receiver nodes;

adjust the offset value to be substantially equal to the maximum current sample-to-render delay; and send a new RTP Control Protocol (RTCP) sender report to each receiver node that contains the adjusted offset value.

6. The non-transitory computer readable medium of claim 5 wherein the RTP frames are sent via a multicast transport or multiple unicast transports.

7. A system comprising:
 a source operable to synchronize a common reference timeframe using a time synchronization protocol;
 a plurality of receivers;
 wherein the source is operable to send a Real-Time Protocol (RTP) stream containing RTP frames over a packet-based network to the receivers, and send a RTP Control Protocol (RTCP) sender report to each receiver node that contains a rendering offset value, each receiver being operable to synchronize to a common reference timeframe using the time synchronization protocol and to render each of the RTP frames at a render time equal to a sampling time, as measured in units of the common reference timeframe, of each of the RTP frames plus the rendering offset value, the rendering offset value being greater than a maximum rendering delay of any of the receivers; and
 each receiver being further operable to send an RTCP receiver report to the source, the RTCP receiver report containing rendering delay information that includes a current sample-to-render delay, the source being further operable to adjust the offset value based on the current sample-to-render delay of each receiver, and to send a new RTCP sender report to each receiver that contains the adjusted offset value, the receivers applying the adjusted offset value to generate a new render time.

* * * * *

UNITED STATES PATENT AND TRADEMARK OFFICE
CERTIFICATE OF CORRECTION

PATENT NO. : 7,724,780 B2  Page 1 of 1
APPLICATION NO. : 11/788620
DATED : May 25, 2010
INVENTOR(S) : Baird et al.

It is certified that error appears in the above-identified patent and that said Letters Patent is hereby corrected as shown below:

Title Pg, Item (73) Assignee: "Cisco Technology, Ink." should read -- Cisco Technology, Inc. --.

Signed and Sealed this

Thirteenth Day of July, 2010

David J. Kappos
*Director of the United States Patent and Trademark Office*